Oct. 10, 1950

O. L. HOPPER 2,524,910

BEARING OIL GROOVE CUTTER

Filed July 14, 1947

INVENTOR
OTTIS L. HOPPER
BY F. D. Hicks
ATTORNEY

Oct. 10, 1950 — O. L. HOPPER — 2,524,910
BEARING OIL GROOVE CUTTER
Filed July 14, 1947 — 2 Sheets-Sheet 2
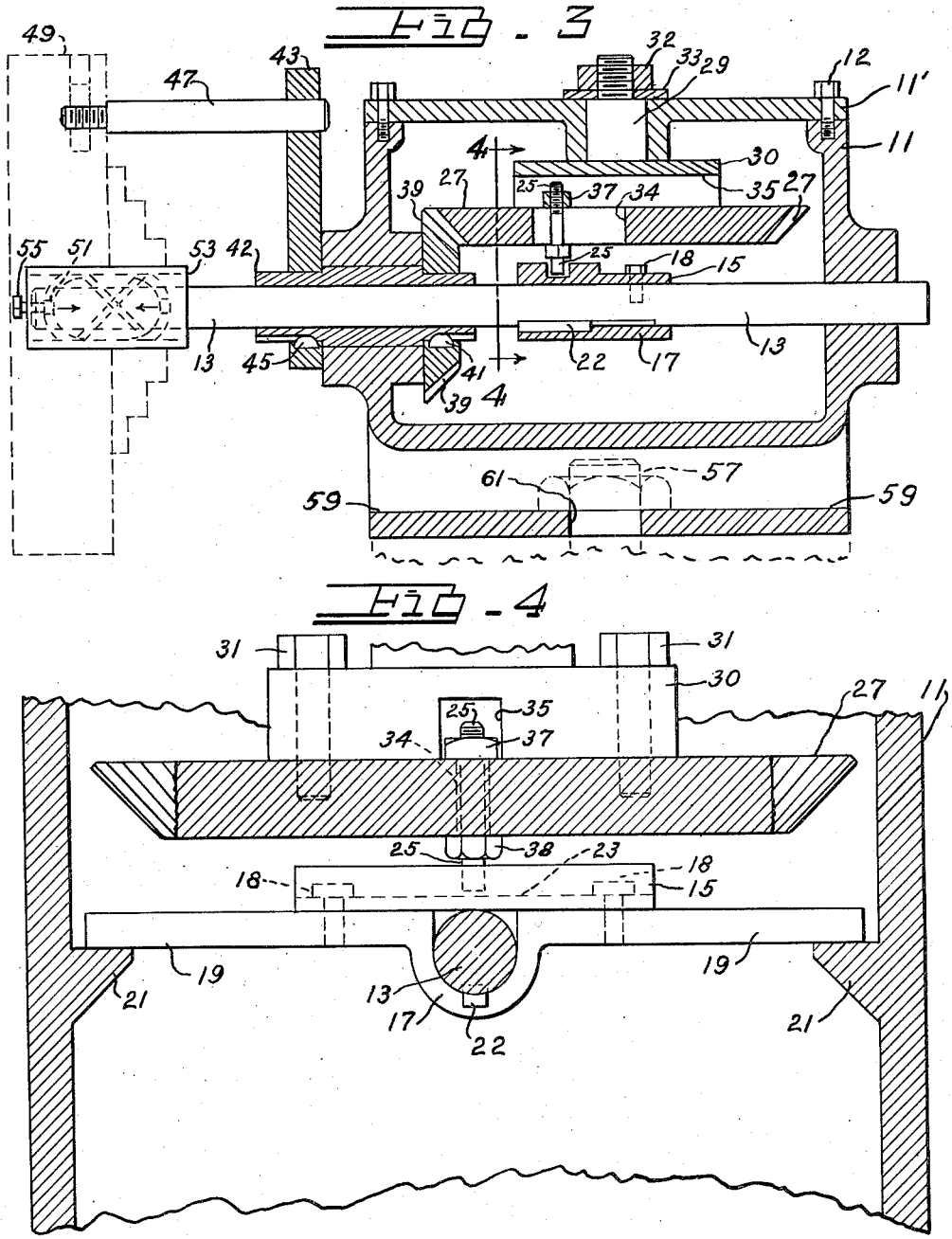
INVENTOR
*OTTIS L. HOPPER*
BY
ATTORNEY Patented Oct. 10, 1950

2,524,910

UNITED STATES PATENT OFFICE 2,524,910

BEARING OIL GROOVE CUTTER

Ottis L. Hopper, Detroit, Mich.

Application July 14, 1947, Serial No. 760,877

4 Claims. (Cl. 82—11)

1

My invention pertains to bearing groove cutting apparatus and more particularly to an attachment device which can be conveniently installed for adapting a shop machine for cutting oil grooves in bearings.

It is an object of my invention to provide an attachment device which can be quickly and conveniently installed upon lathes, or other shop machines, to adapt such machines for cutting oil grooves in bearings.

It is also an object of my invention to provide such a bearing groove cutting attachment device which is of a compact self-contained construction.

It is a further object of my invention to provide such a bearing groove cutting attachment device of a simple rugged construction which can be conveniently adjusted to cut oil grooves in bearings of various sizes.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing a specific embodiment of the invention, in which:

Fig. 3 is a cross-sectional view taken longitudinally through the device, along line 3—3 in Fig. 2; and Fig. 4 is an enlarged fragmentary sectional view on line 4—4 in Fig. 3.

Figure 1:
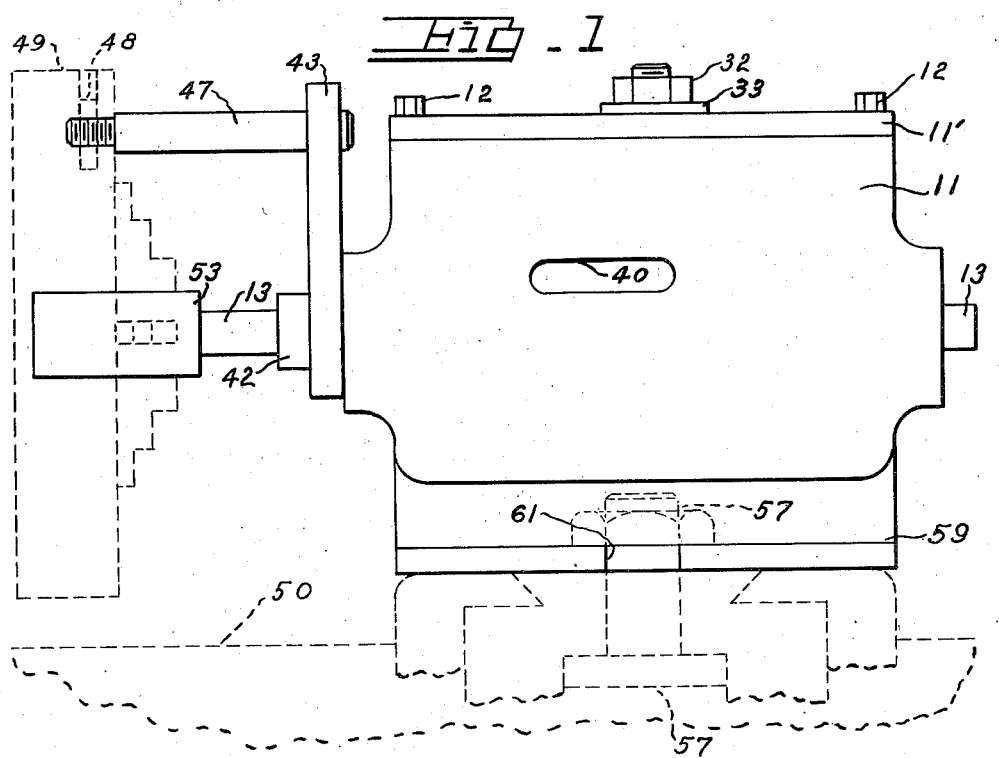
Fig. 1 is a side elevational view showing my bearing oil groove cutting attachment device, and representing in dotted lines a lathe whereupon it is installed.
Figure 2:
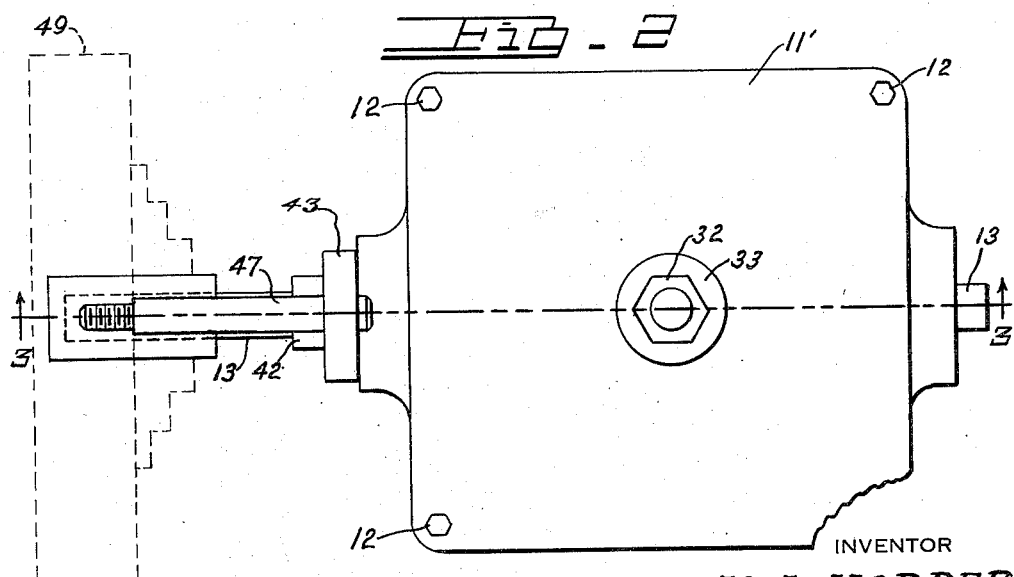
Fig. 2 is a plan view, with parts of the cooperative lathe shown dotted.

Referring more specifically to the figures of the drawings, it will be seen that my bearing oil groove cutting attachment device comprises a self-containing housing 11 having in opposite end walls suitable bearings for slidably mounting a tool supporting shaft 13 passing therethrough. The tool supporting shaft 13 is provided with a slotted block 15 secured, as by screws 18, to a transverse slide member 17 having laterally projecting lugs 19, which as may be seen in Fig. 4, engaged slidably upon guide rails 21 projecting

2 in from opposite side walls of the housing to hold the shaft definitely in a predetermined angular position and eliminate rotation as it reciprocates back and forth with a free movement of translation. The slide 17 fits snugly around the shaft 13 and is secured to it by a key 22. The block 15 is provided with a slot 23, extending transversely to the axis of the shaft, for receiving a crank-pin 25 projecting from a bevel gear 27 which is rotatively supported upon a stud shaft 29 projecting from a plate 30 which is secured on the back of the gear by screws 31. The stud shaft 29 projects outwardly through one top wall 11' of the housing, and has its outer end reduced and threaded to receive a nut 32 and thrust washer 33. Top wall 11' is removably secured on the housing by screws 12.

The crank-pin 25 is adjustably supported in the bevel gear 27 so that its radius of rotation may be adjusted to adjust the stroke to be imparted to the sliding shaft. This readily is accomplished by providing a radial pin receiving slot 34 in the face of the bevel gear 27 opening into a radially extending recess 35 of larger cross-section for holding a nut 37 into which the inner end of the crank-pin 25 is threaded. An exposed intermediate portion of the crank-pin 25 is provided with suitable wrench receiving surfaces 38 so that by reaching through a slot 40 in the side wall and applying a wrench (not shown), the crank-pin 25 may be turned loose in the nut 37 which is held from turning by the recess 35 side walls. Then the crank-pin may be easily moved along in the slot either toward or away from the axis or rotation of the bevel gear, after which it may be firmly clamped and locked in the adjusted position by turning the pin firmly into the nut. The stroke of the tool shaft may in this manner be easily adjusted to suit the length of the bearing which is to be grooved thereby. Also, as will be understood, the crank-pin 25 may be in the alternative form of a bolt with a head where the nut 37 is now shown and wrench portion 38 being replaced by a nut thereon.

The driven gear 27 is actuated from a driving gear 39, which is also a bevel gear, mounted and secured by a key 41 on the inner end of a tubular drive-shaft 42 disposed concentrically, around the sliding shaft 13, in one of the bearings through which it extends out of the housing. On the outer end of the tubular driving shaft 41 a crank 43 is mounted and it is secured firmly thereon, as by a key 45, for rotating the tubular shaft as the crank is turned by a pin 47 projecting from its outer end into operative connection with the chuck plate 49 of the lathe 50, represented in dotted lines, wherein it may be secured in any suitable manner, as by a nut 48, in a T-slot.

The outer end of the tool mounting shaft 13 is slotted to receive a metal cutting tool 51 suitable for cutting an oil groove into the inner surface of a bearing shell 53, and this tool is firmly secured in the end of the shaft in any suitable manner, as by a set screw 55, for example.

When the cylindrical bearing shell 53 has been properly clamped and centered in the chuck plate 49 of a lathe, and the housing 11 of the groove cutting device has been firmly secured upon the tool holder of any lathe by the bolt 57 from the T-slot, the tool holder may be conveniently adjusted to bring the tool into proper engaging relation with the bearing surface.

As the chuck plate of the lathe turns the bearing shell 53, the crank 43 is turned by it and rotates in turn the tubular shaft 42, and bevel gears 39 and 27, the crank-pin 25 causes the sliding tool shaft 13 to reciprocate back and forth through a length of stroke which has been properly preadjusted by setting the crank-pin at a proper radius position, as previously described, to suit the length of the bearing shell. As the tool is moved back and forth it makes a one direction stroke for each rotation of the bearing shell, thereby cutting a crossed oil groove which, in developed form, would resemble a figure 8. By adjusting the feed stroke of the tool support of the lathe this groove can be quickly and accurately cut to the desired depth.

The housing, shafts, bearings, crank and pins may be made of metals selected to have good durability in accordance with usual practice in machine design, but the portability and convenience in handling may be further augmented by making the housing of some of the light weight metals such as aluminum or magnesium or alloys thereof. The device may be effectively lubricated by putting a quantity of a suitable lubricant into the housing just sufficient to submerge the lower edge of the driving gear 39. The housing has an integral L-shaped pedestal flange 59 with a central slot 61 for conveniently receiving any attaching bolt 57.

It is apparent that within the scope of my invention modifications and different arrangements may be made other than herein disclosed, and the present disclosure is illustrative merely, the invention comprehending variations thereof.

What is claimed is:

1. A bearing oil groove cutting attachment device for lathes comprising, a housing adapted to be mounted upon the tool rest of a lathe, a reciprocatable tool shaft mounted slidably in and extending from said housing for supporting a groove cutting tool in engagement in any bearing shell centered and rotated in a lathe chuck, a rotatable tubular shaft disposed concentrically around said shaft and passing through one sidewall of the housing, driving means in said housing operatively interconnecting between said shafts for imparting a reciprocatory movement to said tool shaft as said tubular shaft is rotated, and a crank secured upon and extending from the outer end of said tubular shaft in a suitable position for operative connection and rotation with a lathe chuck plate wherein is supported and rotated the bearing shell which is to be grooved by a tool carried by the tool shaft.

2. In a bearing oil groove cutting attachment device the combination of, a housing adapted to be mounted upon the tool carriage of a shop machine such as a lathe, a reciprocatable shaft slidably mounted in opposite side walls of and extending at both ends from said housing, one end of said shaft being adapted for supporting a groove cutting tool in engagement in any bearing shell to be grooved which is centered and rotated in a lathe chuck, a rotatable tubular shaft disposed concentrically around said reciprocatable shaft and passing through the side wall of the housing toward the tool supporting end of the shaft, driving means in said housing operatively interconnecting between said shafts for imparting a reciprocatory movement to said reciprocatable shaft as said tubular shaft is rotated, and means secured to and extending from the outer end of said tubular shaft for cooperative connection to and rotation with a lathe chuck plate wherein such a bearing shell to be grooved is supported and rotated in centered relation to have an oil groove cut by a tool carried by said reciprocatable shaft.

3. A bearing oil groove cutting attachment device for lathes comprising, a housing adapted to be mounted upon the tool rest of a lathe, a reciprocatable tool shaft mounted slidably in and extending from said housing for supporting a groove cutting tool in engagement in any bearing shell centered and rotated in a lathe chuck, a rotatable tubular shaft disposed concentrically around said shaft and passing through one sidewall of the housing, driving means in said housing operatively interconnecting between said shafts for imparting a reciprocatory movement to said tool shaft as said tubular shaft is rotated, a crank secured upon and extending from the outer end of said tubular shaft in a suitable position for operative connection and rotation with a lathe chuck plate wherein is supported and rotated the bearing shell which is to be grooved by a tool carried by the tool shaft, said driving means comprising a pair of intermeshed bevel gears one of which is secured on the inner end of said tubular shaft, a crank-pin adjustably received in a radial slot in the other bevel gear, and a slotted block secured on the reciprocatable shaft for receiving said crank-pin to cause reciprocation of said reciprocatable shaft through a stroke as determined by the adjusted radial position of said crank-pin.

4. In a bearing oil groove cutting attachment device the combination of, a housing adapted to be mounted upon the tool carriage of a shop machine such as a lathe, a reciprocatable shaft slidably mounted in opposite side walls of and extending at both ends from said housing, one end of said shaft being adapted for supporting a groove cutting tool in engagement in any bearing shell to be grooved which is centered and rotated in a lathe chuck, a rotatable tubular shaft disposed concentricalliy around said reciprocatable shaft and passing through the side wall of the housing toward the tool supporting end of the shaft, driving means in said housing operatively interconnecting between said shafts for imparting a reciprocatory movement to said reciprocatable shaft as said tubular shaft is rotated, means secured to and extending from the outer end of said tubular shaft for cooperative connection to and rotation with a lathe chuck plate wherein such a bearing shell to be grooved is supported and rotated in a centered relation to have an oil groove cut by a tool carried by said reciprocatable shaft, said driving means comprising a pair of intermeshed bevel gears one of which is rotatively mounted in the top wall of said housing, a crank-pin adjustably secured in a radial slot in said one gear, a slotted block secured on the reciprocatable shaft to receive said crank-pin to be thereby reciprocated as said one gear rotates, and the other bevel gear being secured upon the inner end of the tubular shaft in intermeshed driving relation to said one gear.

OTTIS L. HOPPER.

REFERENCES CITED

The following references are of record in the file of this patent:

UNITED STATES PATENTS

| Number | Name | Date |
| --- | --- | --- |
| 930,988 | Raymond | Aug. 10, 1909 |
| 1,153,241 | Mueller | Sept. 14, 1915 |
| 1,504,133 | Mueller | Aug. 5, 1924 |
| 1,596,827 | Groene | Aug. 17, 1926 |
| 1,982,983 | Czemba | Dec. 4, 1934 |

FOREIGN PATENTS

| Number | Country | Date |
| --- | --- | --- |
| 471,502 | Germany | Feb. 13, 1929 |